(12) United States Patent  
Mackin et al.

(10) Patent No.: US 8,573,846 B2
(45) Date of Patent: Nov. 5, 2013

(54) BEARING ARRANGEMENT FOR A TELESCOPIC AXLE

(75) Inventors: Ryan Patrick Mackin, Milan, IL (US); Daniel James Burke, Cordova, IL (US); Bruce Alan Coers, Hillsdale, IL (US); Eric Alln Risius, Hampton, IL (US); Shane Anderson, Syracuse, UT (US); David Rix, Sandy, UT (US)

(73) Assignee: Deere & Company, Moline, IL (US)

( * ) Notice: Subject to any disclaimer, the term of this patent is extended or adjusted under 35 U.S.C. 154(b) by 664 days.

(21) Appl. No.: 12/774,338

(22) Filed: May 5, 2010

(65) Prior Publication Data

US 2011/0274378 A1    Nov. 10, 2011

(51) Int. Cl.
*F16C 29/12* (2006.01)
*B60B 35/00* (2006.01)

(52) U.S. Cl.
USPC ............... 384/40; 384/38; 384/41; 180/906; 301/128

(58) Field of Classification Search
USPC .............................. 384/25, 26, 38–42, 57; 180/24.01–24.03, 209, 905, 906; 301/124.1, 128, 131, 132; 280/124.11, 280/124.111
See application file for complete search history.

(56) References Cited

U.S. PATENT DOCUMENTS

| | | | | |
|---|---|---|---|---|
| 3,537,762 A * | 11/1970 | Lodige | ............................. | 384/42 |
| 5,121,808 A * | 6/1992 | Visentini et al. | .............. | 180/906 |
| 5,464,243 A * | 11/1995 | Maiwald et al. | .............. | 180/906 |
| 5,489,114 A * | 2/1996 | Ward et al. | ..................... | 180/906 |
| 6,764,218 B2 * | 7/2004 | Kanamaru et al. | .............. | 384/38 |
| 7,080,943 B2 * | 7/2006 | Hisanobu et al. | ................ | 384/38 |
| 8,205,899 B2 * | 6/2012 | Mackin et al. | ........... | 280/124.11 |
| 2011/0273003 A1* | 11/2011 | Mackin et al. | ................. | 301/128 |

FOREIGN PATENT DOCUMENTS

| | | |
|---|---|---|
| DE | 896308 | 11/1953 |
| DE | 10034542 | 1/2002 |
| DE | 10034580 | 1/2002 |

OTHER PUBLICATIONS

European Search Report, Aug. 19, 2011, 5 pgs.

* cited by examiner

*Primary Examiner* — James Pilkington

(57) ABSTRACT

An extendible axle member (146 or 148) is provided for a pivoting axle of an agricultural harvester (100), the extendible axle member (146 or 148) having an elongate telescopic portion (400) with bearing surfaces for being slidably received in an outer axle member (142 or 144), wherein the elongate telescopic portion (400) is formed integral with and abuts a C-frame for supporting a steering knuckle (158 or 160).

8 Claims, 6 Drawing Sheets

BEARING ARRANGEMENT FOR A TELESCOPIC AXLE

FIELD OF THE INVENTION

The invention concerns telescopic axles for agricultural harvesters. In particular, it relates to bearing arrangements for those telescopic axles. More particularly, it relates to adjustment mechanisms for bearing arrangements of telescopic axles.

BACKGROUND OF THE INVENTION

Agricultural combines are heavy large machines that harvest, thresh, separate and clean harvested crop, planted agriculturally that carries corn. They include steerable rear wheels mounted on the free ends of rear axles that pivot about a central longitudinal axis.

The axles are telescopic and can be varied in length by stopping the vehicle, loosening clamps and forcing the extendible axle member in (or out) of an outer axle member until a desired axle length is achieved, then tightening short axle clamps to lock the extensible axle member and the outer axle member in that position.

In new harvesters, it has been proposed to permit the extendible axle of the combine to slide in and out of the outer axle while the vehicle is being driven through a field. Hydraulic actuators have been considered for use to extend the axles during operation. In this arrangement the extendible axle member and outer axle member may be provided with a releasable clamp that can be opened when the axles are telescoped and then reapplied when the axle has the desired length.

Axles that can be extended and retracted while the agricultural combine is under way performing its harvesting functions will require improved axles with tighter tolerances and greater load capacity than existing agricultural combine axles.

U.S. Pat. No. 5,121,808 shows a telescoping steering axle with a non driven (gauge) wheel supported on an inner axle member. The inner axle slides loosely into the outer axle and is clamped against one side of the outer axle by bolts that pass through the inner and outer axle. The bolts are located at the outer end of the outer tube and the inner tube is unsupported. This arrangement of telescoped axles that are unclamped while the vehicle is stationary, extended while stationary, then clamped for operation while stationary will not permit the clamped axle to be moved during operation as the agricultural combine travels through the field.

U.S. Pat. No. 5,464,243 shows an extendible axle for a self-propelled sprayer having an outer axle and an inner axle. A clamping arrangement in the form of a V-shaped wedge with plastic shims on top is provided at the bottom of the outer end of the outer tube. Bolts in the bottom of the outer tube are provided to abut the wedge and force it up against the inner tube, lifting the inner tube and wedging in against a plastic shim at the top of the outer tube. This permits the axle, as it wears to be adjusted to remove slack. The bolts are tightened to lock the inner tube in position with the new preferred row spacing. This arrangement is used for relatively lightweight vehicles such as sprayers. The loads are transferred directly to short threads in the wall of the outer axle tube. A vehicle experiencing high loads, (such as an agricultural harvester) runs the risk of tearing these short threads out.

PURPOSE OF THE INVENTION

The purpose underlying the invention herein is seen in the need to provide an improved rear axle that maintains tolerances, reduces wear, is easier to adjust, and handles high loads with less risk of damage than existing arrangements while also permitting the axle to be adjusted in length while underway. This capability is provided by the novel geometry of the adjustable bearing arrangement described herein.

SUMMARY OF THE INVENTION

The problem is solved according to the invention by the teaching of the patent claims herein.

In accordance with a first aspect of an invention, a bearing arrangement is provided for an extendable axle of an agricultural harvester, the axle comprising an outer axle member and an extendable axle member telescopically supported in the outer axle member, the bearing arrangement comprising a first member that is wedged between the outer axle member and an extendable axle member and a first bolt passing through a first clearance hole in a first sidewall of the outer axle member and threadedly engaged with the first member, The first bolt may have a head and the head may abut the sidewall to place the bolt in tension and eliminate slack between the extendable axle member and the outer axle member when the first bolt moves the first member in a first direction toward the first clearance hole.

The bearing arrangement may have a second member that is wedged between the outer axle member and the extendable axle member and may have a second bolt that passes through a second clearance hole in a second sidewall of the outer axle member and may be threadedly engaged with the second member.

The second bolt may have a head and the head may abut the second sidewall to place the second bolt in tension and eliminate slack between the extendable axle member and the outer axle member when the second bolt moves the second member in a second direction opposite the first direction.

The outer axle member may have a first planar surface, and the first and second members may each have a planar surface that rests on the first planar surface of the outer axle member and is coplanar therewith.

The first and second bolts may extend parallel to each other and parallel to the first planar surface of the outer axle member.

The first and second members each may have a second planar surface that is disposed at a first angle with respect to their respective first surfaces. That first angle is may be the same for both the first and second members.

The first and second bolts may draw the first and second members closer together when the first and second blots are tightened.

The first angles may be 45 degrees.

The angle between the second planar surfaces of the first and second members may be 90 degrees.

A V-shaped bearing may be supported on the second bearing surfaces of the first and second members.

The first and second members may be elongate and may extend in a direction parallel to the longitudinal extents of the outer axle members and the extendible axle members. Up plurality of first bolts and second bolts may be spaced apart in the longitudinal direction along the length of first and second members.

BRIEF DESCRIPTION OF THE DRAWINGS

Embodiments of the inventions identified above are explained on the basis of the FIGURES, in which.

DETAILED DESCRIPTION OF THE PREFERRED EMBODIMENTS

In the discussion below, "forward", "front", "in front of" or like words refer to the forward direction of travel of the agricultural combine, which is parallel to the longitudinal axis of the agricultural combine, and also parallel to the pivoting axis of the rear axle. In the discussion below, "rearward", "rear", "behind", and like words refer to the direction opposite to the forward direction of travel of the agricultural combine.

In the discussion below, the description of features or structures of the right side of the rear axle assembly is identical for the left side of the rear axle assembly, and the novelties noted and/or claimed with regard to the right side of the rear axle assembly are equally as novel for the left side. Only the right side is described in detail below for convenience. The comments made regarding the right side are equally applicable to the left side, but in mirror relation. The rear suspension is mirror symmetrical about a vertical plane that contains the pivoting axis of the rear axle assembly.

Figure 1:
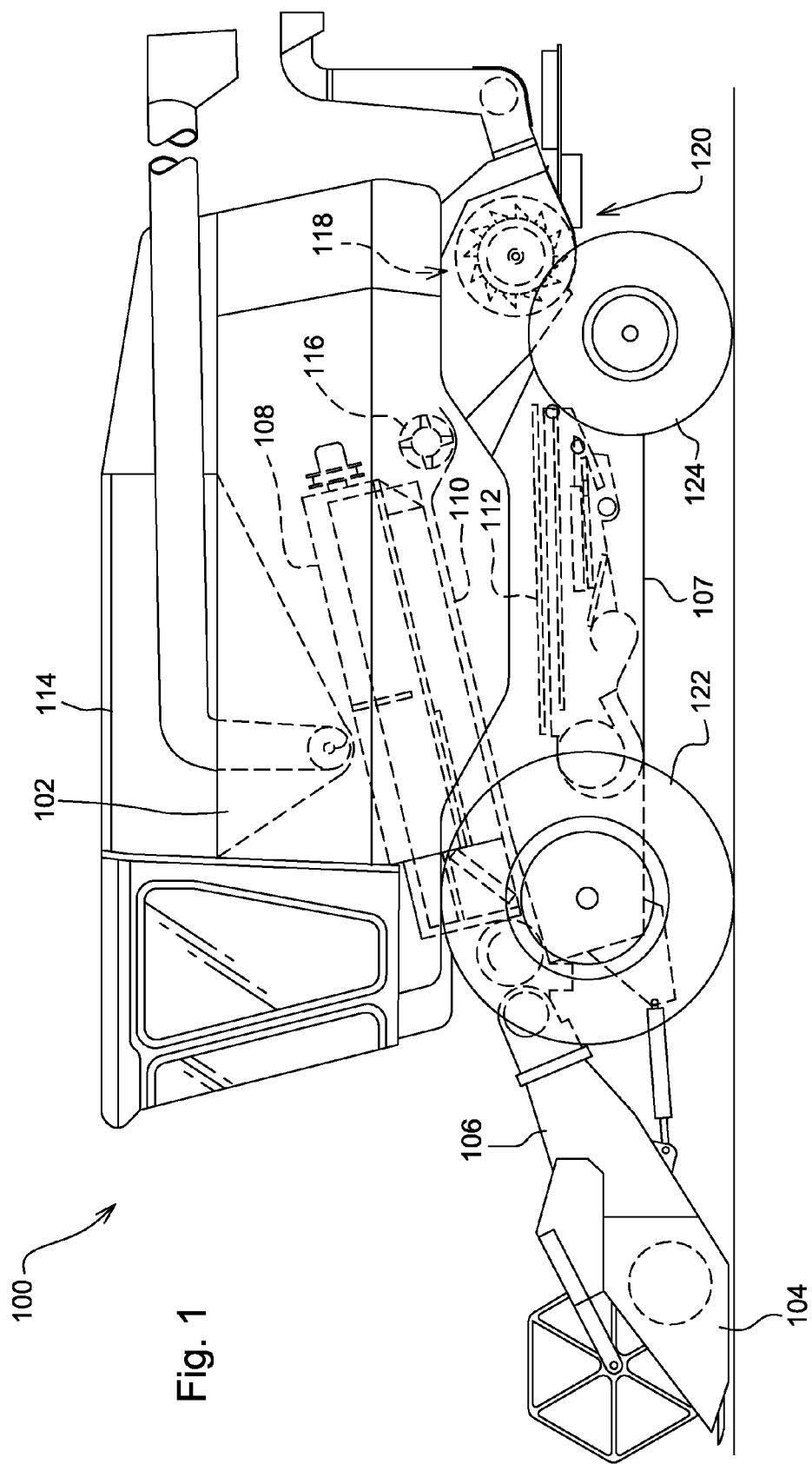
FIG. 1 shows a partial phantom left side view of an agricultural harvester in accordance with this invention.

FIG. 1 illustrates an agricultural harvester 100 in accordance with the present invention. The harvester comprises a harvester vehicle 102 having a harvesting head 104 supported on a feederhouse 106 that is mounted on the front of harvester vehicle 102 on the vehicle chassis 107. A longitudinally extending rotor 108 is disposed to rotate within a concave 110 to separate crop material (i.e. grain) from crop residue.

An oscillating cleaning shoe 112 is supported underneath the concave to receive crop material. The crop material is cleaned in the cleaning shoe and is carried upward into a grain tank 114. Crop residue leaving the rear end of rotor 108 is directed into a beater 116 which separates some residual crop material from the crop residue and directs that residual crop material into the cleaning shoe 112. Crop residue exiting the beater 116 is directed rearward into an inlet 118 of chopper 120. Similarly, crop residue separated from the material in the cleaning shoe 112 is also directed into chopper 120. The crop residue exiting beater 116 typically includes cornstalks. The crop residue exiting the cleaning shoe typically includes chaff and other light crop residue.

Identically arranged left and right front wheels 122 (only the left is shown) are coupled to the chassis 107 to support the front of the harvester on the ground. They are driven in rotation by hydraulic drive motors to propel the harvester. Identically arranged left and right rear drive wheels 124 are coupled to the chassis 107 to support the rear of the harvester on the ground.

Figure 2:
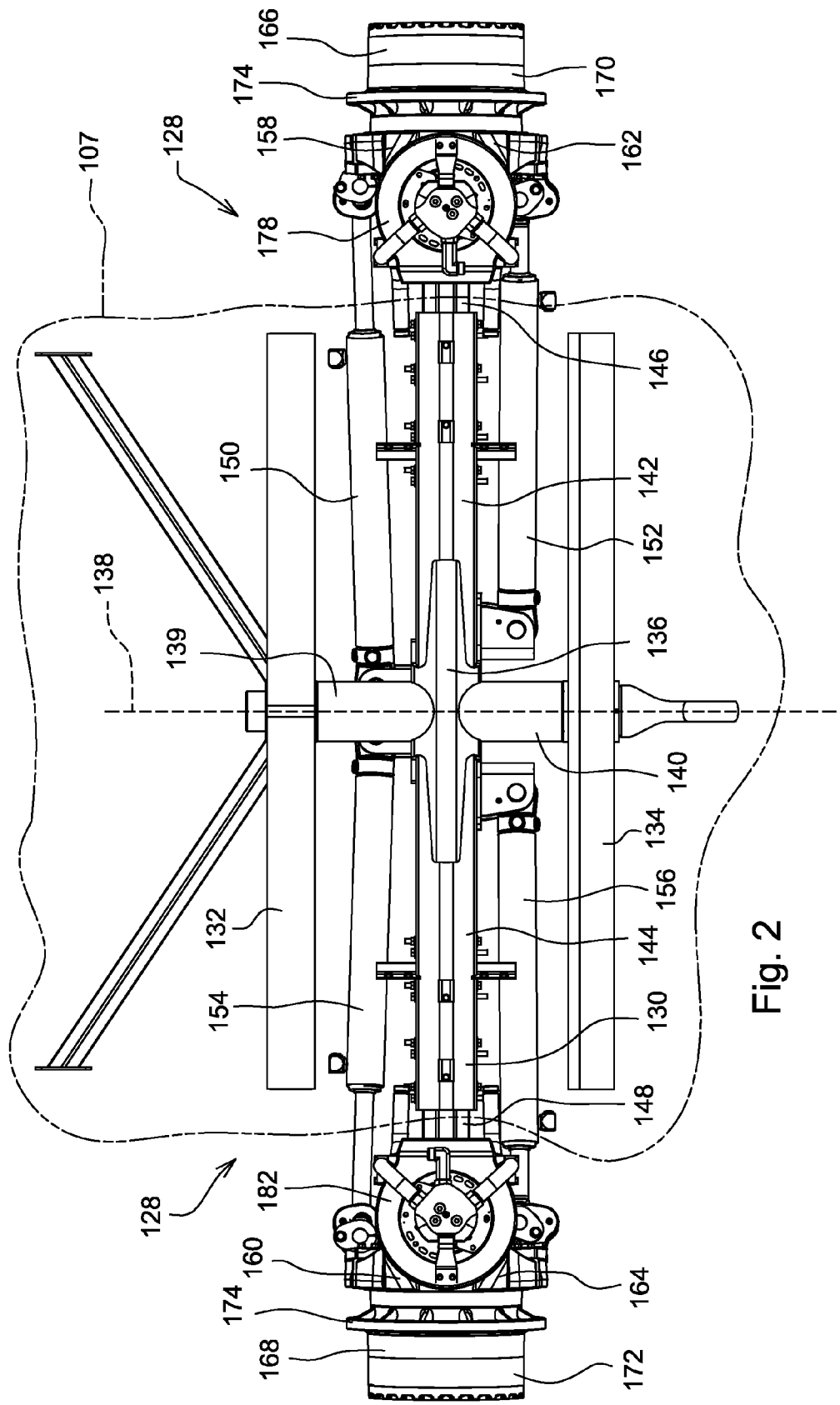
FIG. 2 is a fragmentary top view of the rear suspension of the harvester of FIG. 1.
Figure 3:
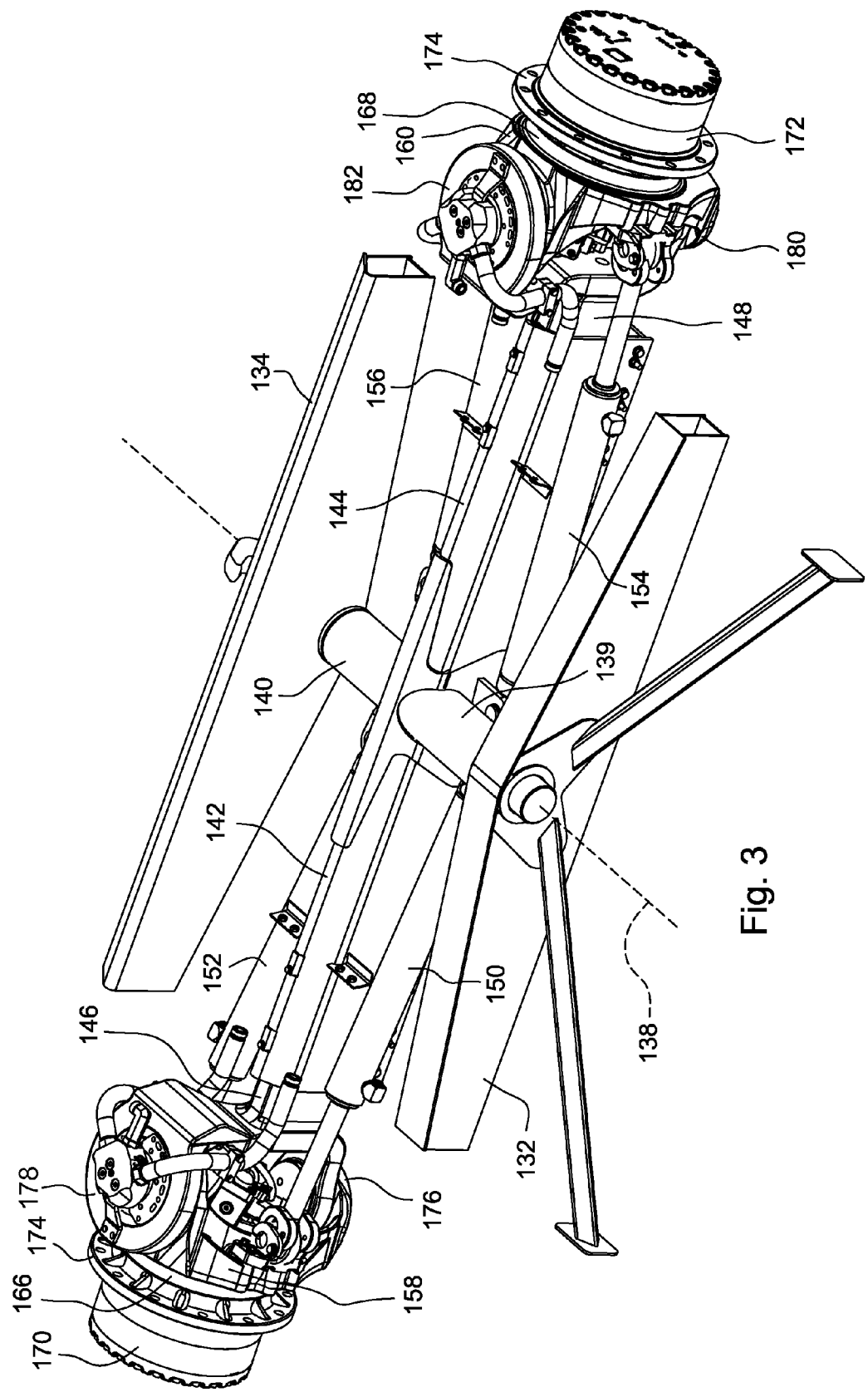
FIG. 3 is a perspective top view of the rear suspension of the harvester of FIGS. 1-2.

Referring to FIGS. 2 and 3, the chassis 107 is supported on a rear axle assembly 128 that includes a steerable rear axle 130 supported on front and rear axle mounts 132, 134. Front and rear axle mounts 132, 134 are fixed to the bottom of the chassis 107 and support central axle member 136 for pivoting about longitudinal pivot axis 138.

The central axle member 136 is in the form of a cross, with a forwardly extending tubular coupling 139 supported for pivoting in front axle mount 132 and a rearwardly extending tubular coupling 140 supported for pivoting in rear axle mount 134. Central axle member 136 also comprises right and left outer axle members 142, 144 that are fixed rigidly to, and extend to the right and to the left from, the couplings 139, 140 to form the rigid elongate central axle member 136.

The rear axle assembly 128 is symmetric about a vertical plane that passes longitudinally through the agricultural harvester and in particular through the longitudinal pivot axis 138. Henceforth, any discussion of one side of the rear axle assembly is true for the other side as well.

Rear axle assembly 128 further includes right and left extendible axle members 146, 148 that are slidably supported in right and left outer axle members 142, 144, respectively, to be slid in and out by hydraulic actuators 150, 152 here shown as hydraulic cylinders (on the right side) and hydraulic actuators 154, 156, here shown as hydraulic cylinders (on the left side).

The hydraulic actuators are disposed on each side of the outer axle members and are coupled at their inner ends to their respective outer axle member and at their outer ends to right and left and left steering knuckles 158, 160 that in turn are pivotally mounted to steering knuckle mounts on the outer ends of the extendible axle members. By this arrangement, the extendible axle members can be extended from or retracted into the outer axle members by extending or retracting the hydraulic cylinders. Further, the steering knuckles are pivotally coupled to the ends of the extendible axle members and can be steered to the left or right by extending one of the hydraulic actuators more or less than the other of the hydraulic actuators.

The right and left steering knuckles 158, 160 support right and left hydraulic motors 162, 164 on lower and upper, right and left steering knuckle mounts 176, 178, 180, 182 that are coupled to and drive right and left planetary gearboxes 166, 168. Right and left output shafts from the planetary gearboxes drive right and left wheel hubs 170, 172, in rotation. Each of the wheel hubs has a flange 174 to which the rear wheels are attached. Thus the hydraulic motors drive the wheels in rotation. Since they are mounted to the steering knuckles, the motors and the wheels can be extended or steered to the right and to the left by selectively extending and retracting the hydraulic actuators.

Figure 4:
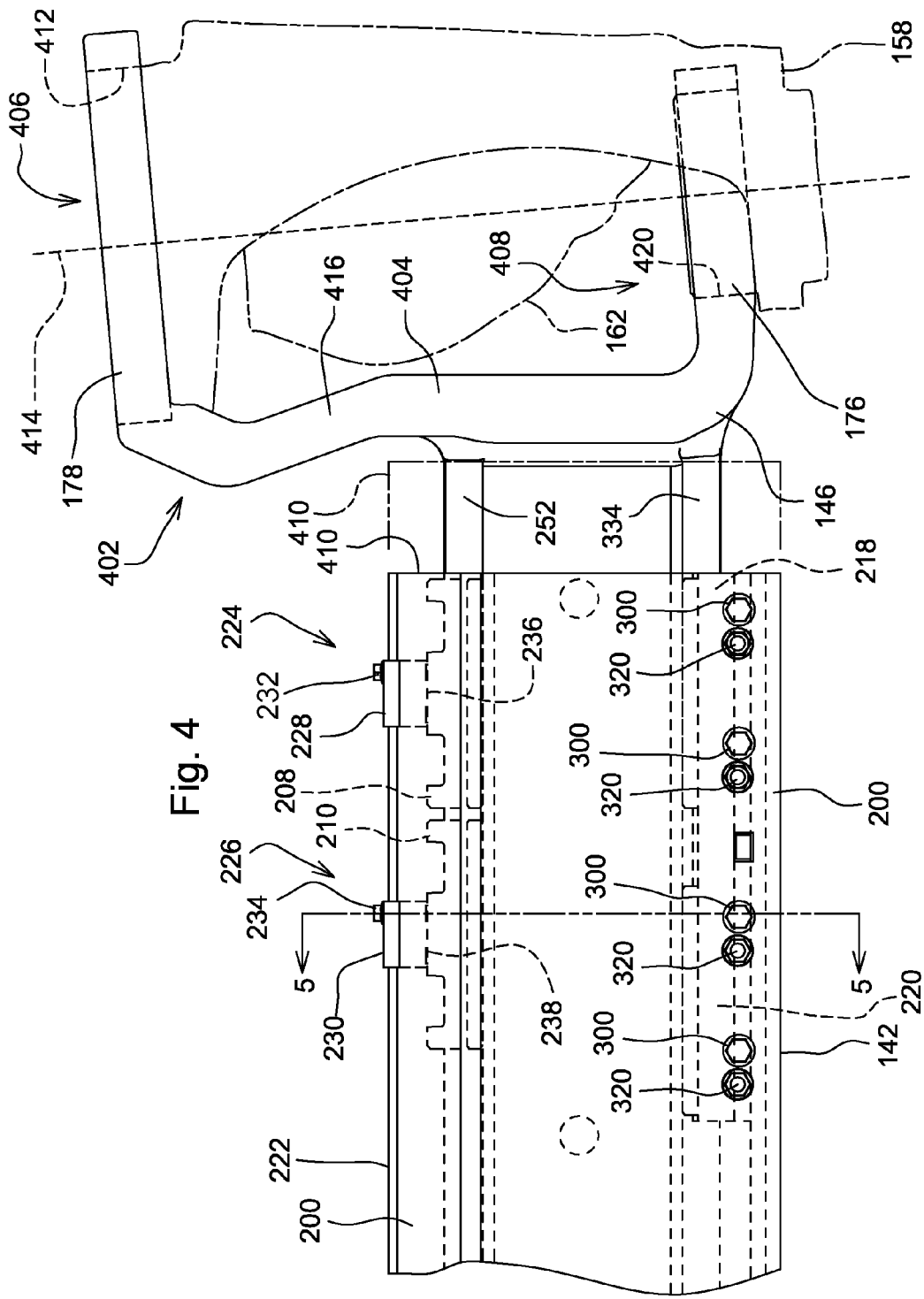
FIG. 4 is a fragmentary rear view of the right side extendible axle member and outer axle member of FIGS. 2-3.
Figure 5:
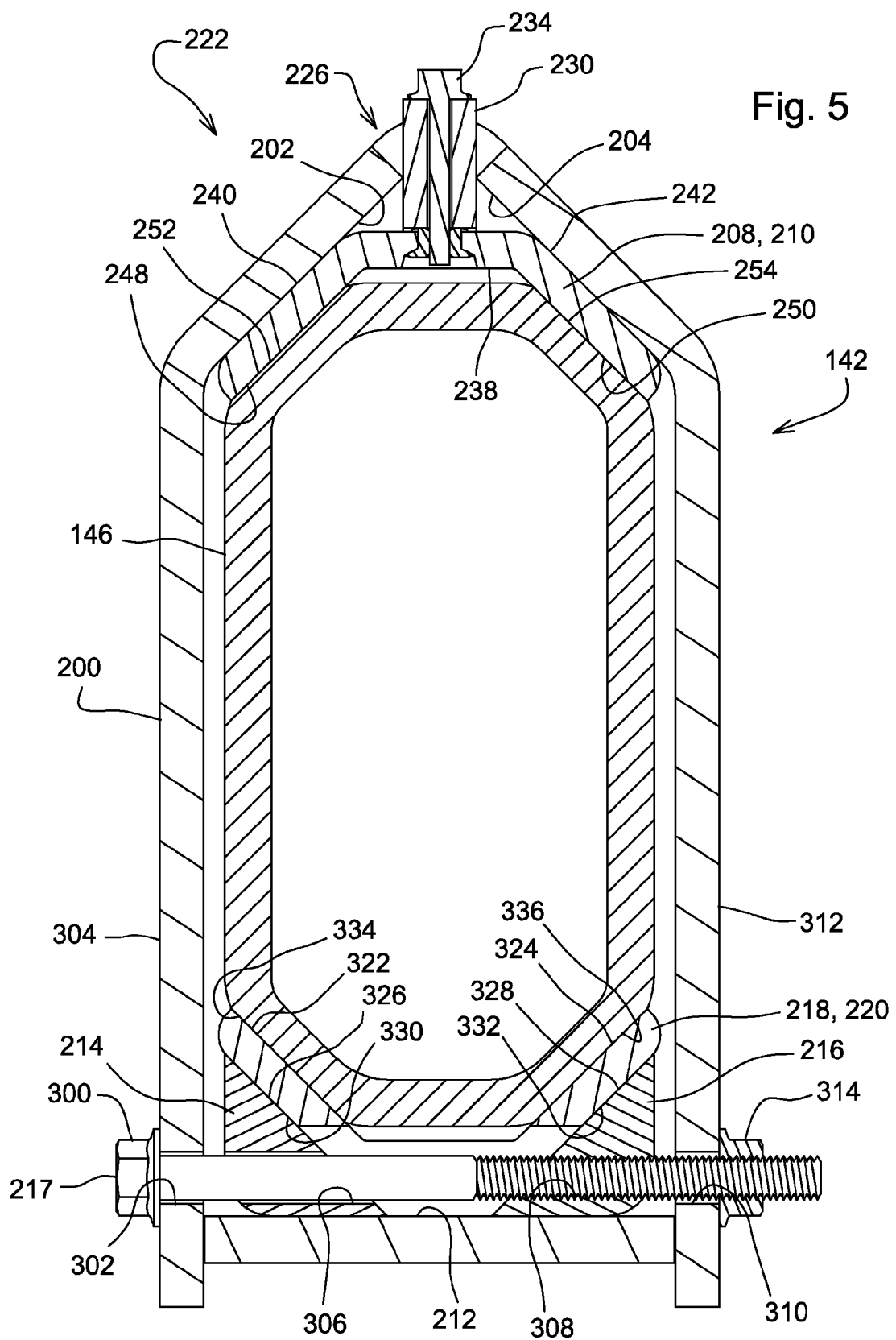
FIG. 5 is a cross-sectional view of the right side extendible axle member and outer axle member of FIG. 4 taken at section line 5-5 in FIG. 4.

Referring to FIGS. 4 and 5, the right outer axle member 142 is comprised of an elongate tubular structure 200 having a constant cross sectional profile over its length that supports the right extendible axle member 146 over substantially the entire length of the right extendible axle member when the right extendible axle member is inserted completely into the outer axle member. Inside planar top surfaces 202, 204 support V-shaped planar bearings 208, 210. Planar bottom surface 212 supports two elongate wedge-shaped adjustment members 214, 216, which in turn support V-shaped bearings 218, 220.

Elongate tubular structure 200 has a peaked top surface 222. This peaked arrangement helps prevent plant matter from collecting on top of the axle. By keeping the top of elongate tubular structure 200 clean, less material falls long to the exposed upper surface of extendable axle member 146, and therefore less material contaminates the sliding bearing surfaces of V-shaped planar bearings 208, 210.

Spaced apart rectangular slots 224, 226 are configured to receive guide members 228, 230 that are fixed to the top of V-shaped planar bearings 208, 210. Removable fasteners 232, 234 fix guide members 228, 230 to a central web 236, 238 of V-shaped planar bearings 208, 210 to extend upwardly therefrom.

The outer and upper surfaces 240, 242 of V-shaped planar bearings 208, 210 abut the inside top surfaces 202, 204 of elongate tubular structure 200. Inside top surfaces 202, 204 are disposed at a 90° angle to each other. Upper surfaces 240, 242 are disposed at a 90° angle to each other and are coplanar with inside top surfaces 202, 204, respectively.

The inner surfaces 248, 250 of each of V-shaped planar bearings 208, 210 are planar and are disposed at a 90° angle to each other. They are also parallel to and spaced equidistantly from outer and upper surfaces 240, 242, respectively.

Inner surfaces 248, 250 are configured to slidingly engage two upper and outer surfaces 252, 254 of right side extendable axle member 146. Upper and outer surfaces 252, 254 are also disposed at a 90° angle to each other.

V-shaped bearings 208, 210 are held in place with respect to elongate tubular structure 200 by guide members 228, 230. When right extendable axle member 146 is extended and retracted with respect to elongate tubular structure 200 by hydraulic cylinders 150, 152, surfaces 252, 254 function as bearings and slide against inner surfaces 248, 250.

V-shaped bearings 208, 210 are disposed one behind the other longitudinally along the inside length of elongate tubular structure 200. In the preferred arrangement illustrated here, two V-shaped bearings 208, 210 are provided to support right extendable axle member 146 within elongate tubular structure 200. In an alternative arrangement, more V-shaped bearings could be provided to support the extendable axle member 146 over greater length when the extendable axle member 146 is completely retracted within elongate tubular member 200.

The two elongate wedge-shaped adjustment members 214, 216 are disposed inside and rest upon the planar bottom surface 212 of elongate tubular structure 200. They are not fixed to the planar bottom surface 212, but can be translated in a direction perpendicular to the longitudinal extent of elongate tubular member 200, toward and away from the lower portion of extendable axle member 146.

For each V-shaped bearing, two first bolts 300 extend through a clearance aperture 302 in a first lower sidewall 304 of elongate tubular structure 200. Bolts 300 extend through a second clearance aperture 306 in elongate wedge-shaped adjustment member 214. Bolts 300 are then threadedly engaged in a threaded aperture 308 in the elongate wedge-shaped adjustment member 216. The threaded free end portions of bolts 300 extend completely through a third clearance aperture 310 in a second lower sidewall 312 of elongate tubular structure 200. Lock nuts 314 are threadedly engaged to the portion of bolts 300 that extends completely through elongate tubular structure 200, and are locked against the outer surface of second lower sidewall 312 to prevent bolts 300 from rotating with respect to elongate tubular structure 200.

In this arrangement, bolts 300 are under tension and hold elongate wedge-shaped adjustment member 216 against an outer lower surface of V-shaped bearings 218, 220. When agricultural harvester 100 is driven through the field, an outward force is applied by extendable axle member 146 to V-shaped bearings 218, 220, which is further communicated to elongate wedge-shaped adjustment members 214, 216, attempting to drive them apart (i.e. to drive member 214 to the left, and to drive member 216 to the right in FIG. 5). The rightward force applied to elongate wedge-shaped adjustment member 216 is resisted by bolts 300, which are placed in tension by this rightward force. This rightward force is communicated through the threads of the adjustment member 216 into the threads of the bolts 300, and up the shaft of the bolts, where rightward movement is resisted by the heads 217 of bolts 300.

In a prior art arrangement, movement of adjustment members away from a sliding axle member is provided by studs that are threaded engaged to the relatively thin sidewall of elongate tubular structure 200. This tends to strip the threads of the studs and the sidewall of the outer axle member.

Bolts 320 are identically arranged as bolts 300, and provide the identical function as bolts 300, by extending in the opposite direction as bolts 300 through a clearance hole in lower sidewall 312, through another clearance hole in elongate wedge-shaped adjustment member 216, and are threadedly engaged to elongate wedge-shaped adjustment member 214 in an identical fashion, but in a mirror image arrangement. Bolts 320 by their threaded engagement with elongate wedge-shaped adjustment member 214, resist outward forces against member 214, and communicate those tensile forces to the heads of bolts 320.

Elongate wedge-shaped adjustment members 214, 216 are provided to eliminate slack between the extendable axle member 146 and elongate tubular structure 200. As the bearing surfaces 322, 324 provided on the V-shaped bearings 218, 220 begin to wear, slack is produced. This slack is eliminated by loosening the lock nuts on bolts 300, 320, then tightening bolts 300, 320. Tightening the bolts draws elongate wedge-shaped adjustment members 214, 216 inwardly toward each other in a horizontal direction across the planar bottom surface 212 of elongate tubular structure 200.

Elongate wedge-shaped adjustment members 214, 216 have two bearing support surfaces 326, 328 that bear against bearing surfaces 330, 332. As bearing support surfaces 326, 328 are drawn together in this adjustment process, they slide inward against bearing surfaces 330, 332 from opposite sides and in opposite directions thereby forcing V-shaped bearings 218, 220 straight upward (assuming members 214, 216 are adjusted the same distance), eliminating the slack, and moving sliding bearing surfaces 322, 324 upward against the lower bearing surfaces 334, 336 of extendable axle member 146. When bolts 300, 320 are tightened an equal amount, the effect is to lift extendable axle member 146 straight upward, without bringing it closer to one side or the other of elongate tubular structure 200. It retains its fore-and-aft position in the axle assembly. This beneficially maintains the steerable rear axle dynamics and its caster and camber angles.

V-shaped bearings 218, 220 therefore slide in the longitudinal direction (the front to rear direction) with respect to their supporting members (members 214, 216) while translating vertically with respect to the axle housing (structure 200). V-shaped bearings 218, 220 are pinched from both sides between members 214, 216 when the gap between members 214, 216 is narrowed and are thereby forced upward, reducing the slack.

Surfaces 322, 324 are at a 90° angle with respect to each other and are each at 45° with respect to vertical. Surfaces 326, 328 are at a 90° angle with respect to each other, and are each at 45° with respect to vertical. Surfaces 330, 332 are at a 90° angle with respect to each other, and are each at 45° with respect to vertical. Surfaces 334, 336 are at a 90° angle with respect to each other, and are each at 45° with respect to vertical. Surfaces 322, 326, 330 and 334 are planar and parallel to each other. Surfaces 324, 328, 332, and 336 are planar and parallel to each other.

Figure 6:
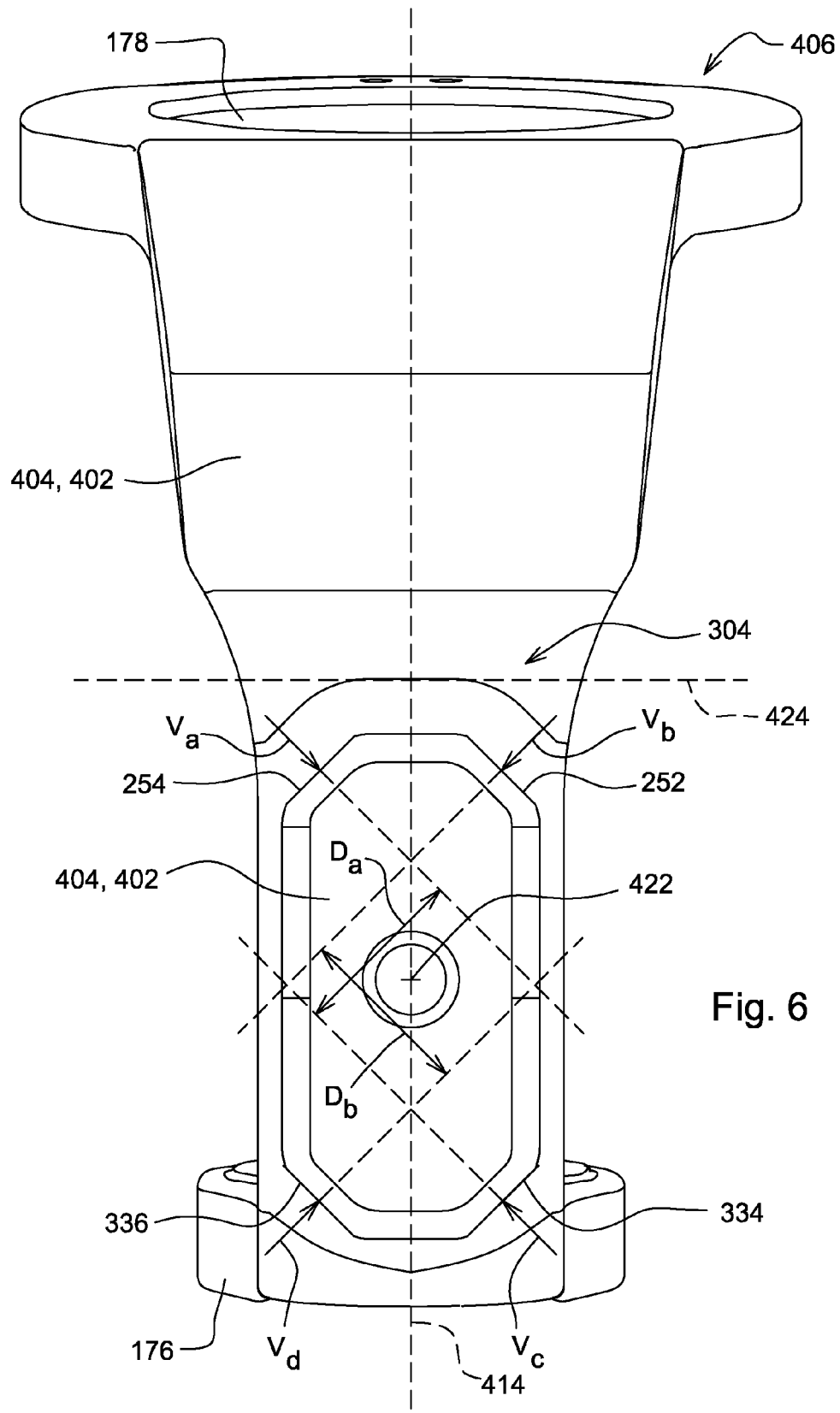
FIG. 6 is a left side view of the right side extendible axle member of the foregoing FIGURES.

Referring now to FIG. 6, the extendible axle member 146 is formed of an elongate portion 400 that is fixed to and formed integral with a C-frame 402, which is in turn comprised of a vertical member 404 to which an upper horizontal member 406 is fixed and to which a lower horizontal member 408 is fixed.

Elongate telescopic portion 400 is formed integral with or is fixed permanently to C-frame 402. The former is preferably achieved by simultaneously casting or forging the C-frame 402 and the elongate telescopic portion 400. The latter is preferably achieved by welding C-frame 402 to elongate telescopic portion 400.

Elongate telescopic portion 400 has bearing surfaces 252, 254, 334, 336, each disposed at a 45° angle with respect to vertical. Bearing surfaces 252, 254, 334, 336 form beveled corners of elongate telescopic portion 400. The surfaces are planar and extend substantially the entire length of elongate telescopic portion 400.

Elongate telescopic portion 400 is configured to be received completely within elongate tubular structure 200 such that it is supported solely upon bearing surfaces 248, 250, 322, and 324 of V-shaped bearings 208, 210, 218, and 220. Bearing surfaces 248, 250, 322, and 324 are disposed at four corners of elongate tubular structure 200 and support the elongate telescopic portion 400 at four corners. The four bearing surfaces 248, 250, 322, and 324 support elongate telescopic portion 400 within elongate tubular structure 200 such that the bottom wall and sidewalls of elongate tubular structure 200 would do not contact elongate telescopic portion 400. Similarly, the bottom wall, top wall, and sidewalls of elongate telescopic portion 400 do not contact elongate tubular structure 200.

Vertical member 404 is larger in side view (i.e. as viewed in FIG. 6: in a direction parallel to the longitudinal extent of elongate telescopic portion 400) than the elongate telescopic portion 400. Vertical member 400 cannot therefore be received in the open outer end 410 of tubular structure 200. The robust way in which elongate tubular structure 200 is constructed together with the V-shaped bearings 208, 210, 218, 220 permits a very compact telescopic portion—compact in both the vertical and horizontal directions—that permits the axle itself to be made light weight and smaller, such that the C-frame 402 extends forward of the forwardmost portion of elongate telescopic portion 400, the C-frame 402 extends behind the rearmost portion of elongate telescopic portion 400, the C-frame 402 extends above the uppermost portion of elongate telescopic portion 400, and the C-frame 402 extends below the lowermost portion of elongate telescopic portion 400.

Upper horizontal member 406 has a steering knuckle mount 178. Lower horizontal member 408 has a steering knuckle mount 176. Steering knuckle mount 178 is defined by a first aperture 412 that defines a generally vertical steering axis 414. Steering knuckle mount 176 is defined by a second aperture 420 having a smaller diameter than the diameter of first aperture 412. Axis 414 passes through and is defined by the center of second aperture 420.

Axis 414 is oriented generally vertically and preferably slightly away from vertical to provide a suitable caster angle and camber angle for the right rear wheel.

In order to locate the steering knuckle as closely as possible to the side of the combine, vertical member 404 is provided with a bend 416 that permits an upper portion of vertical member 404 to extend over the top of outer end 410 of tubular structure 200. The position 418 of outer end 410 when elongate portion 400 is completely retracted into elongate tubular structure 200 is shown in dashed lines in FIG. 4. To permit the upper steering knuckle to extend over the top of outer end 410, the elongate portion 400 is fixed asymmetrically to vertical member 404, such that the center of area 422 (FIG. 6) of the elongate telescopic portion 400 is disposed below the vertical midline 424 of the vertical member 404. As shown in FIG. 4, elongate telescopic portion 400 is fixed to the bottom half of vertical member 404 completely below the vertical midline 424 of the vertical member 404.

This arrangement provides a housing for the motor 162, the housing being defined by the C-frame 402 and steering knuckle 158 which substantially enclose hydraulic motor 162.

The elongate telescopic portion 400 is rectangular, not square. It is greater in its vertical extent (height) than in its horizontal extent (width). Since the shape is not square, it offsets diagonally disposed bearing surface 254, 334 and diagonally disposed bearing surface pair 252, 336. When these surfaces are disposed at the corners of an elongate telescopic portion 400 having an alternative square cross section, they directly oppose each other on opposite sides of the square cross section.

Each of the two diagonally offset pair of bearings 254, 334, and 252, 336 have surfaces that are opposed to each other: the surfaces lie in parallel planes, facing in opposite directions, i.e. facing in 180 degree opposed directions. When the motor 162 drives the wheel on the end of extendable axle portion 146 in rotation, one pair of diagonally opposed bearing surfaces 254, 334 resists motor-induced rotation in one direction, and the other pair of diagonally opposed bearing surfaces 252, 336 resists motor-induced rotation in the other direction. The forces applied to each bearing surface are normal to that bearing surface. They are distributed evenly across the entire bearing surface, and therefore can be modeled by a single force vector located at the midline of the bearing surface. The force vector due to motor torque applied to surface 254 is identified as "Va". The force vector due to motor torque applied to surface 252 is identified as "Vb". The force vector due to motor torque applied to surface 334 is identified as "Vc". The force vector due to motor torque applied to surface 336 is identified as "Vd". (FIG. 6) The lines of action of the forces acting on diagonally opposed surfaces are offset from each other by a distance "Da" and "Db". The offset distances "Da" and "Db" illustrated herein are equal since the elongate telescopic portion 400 is symmetrical.

Each diagonally opposed pair of bearing surfaces shown in the illustrations herein is completely offset. A plane 426 disposed between bearing surface 254 and bearing surface 334 that extends perpendicular to the bearing surfaces and hence parallel to the forces acting on the bearing surfaces does not intersect either bearing surfaces. Plane 426 is illustrated herein passing through the center of area 422 of elongate telescopic portion 400, although it need not do so. Forces therefore cannot act on any portion of the bearing surface and be directly opposed along the same axis by a force applied to the diagonally opposed bearing surface. All the forces applied to diagonally opposing bearing surfaces generate a torque resisting the torque generated by motor 162. A force applied to any portion of the bearing surfaces 254, 334 generates a torque. The same would be true about the other diagonally opposed pair of bearing surfaces 252, 336 due to the symmetry of the elongate telescopic portion 400 about a vertical axis and a horizontal axis. Thus the elongate telescopic portion 400 can resist torques applied when it accelerates in the forward direction and in the reverse direction.

To further equalize wear on the four bearing surfaces 252, 254, 334, 336 of the elongate telescopic portion 400, the bearing surfaces are distributed about the steering axis 414 defined by the steering knuckle mounts 176, 178 such that two of the bearing surfaces (254, 336) are disposed forward of the steering axis in the direction of travel, and the other two bearing surfaces (252, 334) are disposed behind the steering axis in the direction of travel. This makes the load applied to each bearing surface more equal and therefore tends to equalize the wear on the bearing surfaces and also on the V-shaped bearings that support the bearing surfaces.

Vertical member 404 is fixed to and formed integral with the outer end of elongate telescopic portion 400 such that vertical member 402 of C-frame 402 is in an abutting relation with elongate telescopic portion 400. Elongate telescopic portion 400 is hollow over substantially its entire length, and is enclosed at its outer end by vertical member 404 which is fixed across this opening. This provides superior strength as compared to axles in which the C-frame is entirely eliminated and upper and lower steering knuckle mounts are formed in the top wall and bottom wall of an elongate extendable tubular portion similar to the elongate telescopic portion 400.

The invention claimed is:

1. A bearing arrangement for an extendable axle of an agricultural harvester, the axle comprising an outer axle member (142,144) and an extendable axle member (146,148) telescopically supported in the outer axle member (142,144), the bearing arrangement comprising:
   a first member (214, 216) that is wedged between the outer axle member (142,144) and the extendable axle member (146,148);
   a first bolt (300) passing through a first clearance hole (302) in a first sidewall (304) of the outer axle member (142, 144) and threadedly engaged with the first member (216);
   a second member (214) that is wedged between the outer axle member (142,144) and the extendable axle member (144, 146); and
   a second bolt (320) that passes through a second clearance hole in a second sidewall (312) of the outer axle member (142, 144) and is threadedly engaged with the second member (214),
   wherein the outer axle member (142,144) has a first planar surface (212), wherein the first member and the second member each has a planar surface that rests on the first planar surface (212) of the outer axle member (142,144) and is coplanar therewith.

2. The bearing arrangement of claim 1, wherein the first bolt and the second bolt (300, 320) extend parallel to each other and parallel to the first planar surface (212) of the outer axle member (142, 144).

3. The bearing arrangement of claim 2, wherein the first bolt and the second bolt are disposed to draw the first member and the second member closer together when the first and second blots are tightened.

4. The bearing arrangement of claim 2, wherein the first member and the second member (216, 214) each have a second planar surface (328, 326) that is disposed at a first angle with respect to their respective first surfaces, and further wherein that first angle is the same for both the first and second members (214, 216).

5. The bearing arrangement of claim 4, wherein the first angles are 45 degrees.

6. The bearing arrangement of claim 4, wherein an angle between the second planar surfaces of the first member and the second member (214, 216) is 90 degrees.

7. The bearing arrangement of claim 4, wherein a V-shaped bearing (218, 220) is supported on the second planar surface of the first member (216,214) and is also supported on the second planar surface of the second member (216,214).

8. A bearing arrangement for an extendable axle of an agricultural harvester, the axle comprising an outer axle member (142,144) and an extendable axle member (146,148) telescopically supported in the outer axle member (142,144), the bearing arrangement comprising:
   a first member (214,216) that is wedged between the outer axle member (142,144) and the extendable axle member (146,148);
   a first bolt (300) passing through a first clearance hole (302) in a first sidewall (304) of the outer axle member (142, 144) and threadedly engaged with the first member (216);
   a second member (214) that is wedged between the outer axle member (142,144) and the extendable axle member (144, 146); and
   a second bolt (320) that passes through a second clearance hole in a second sidewall (312) of the outer axle member (142, 144) and is threadedly engaged with the second member (214),
   wherein the first member (216, 214) and the second member (216, 214) are elongated and extend in a direction parallel to a longitudinal extent of the outer axle member (142, 144) and a longitudinal extent of the extendable axle member (146,148) and further wherein a plurality of first bolts (300) and second bolts (320) spaced apart in the longitudinal direction along the length of first and second members (216,214).

* * * * *